(No Model.)  
2 Sheets—Sheet 1.
J. W. HAYES, Jr.
WAGON BOX LIFTER.
No. 537,638.  
Patented Apr. 16, 1895.
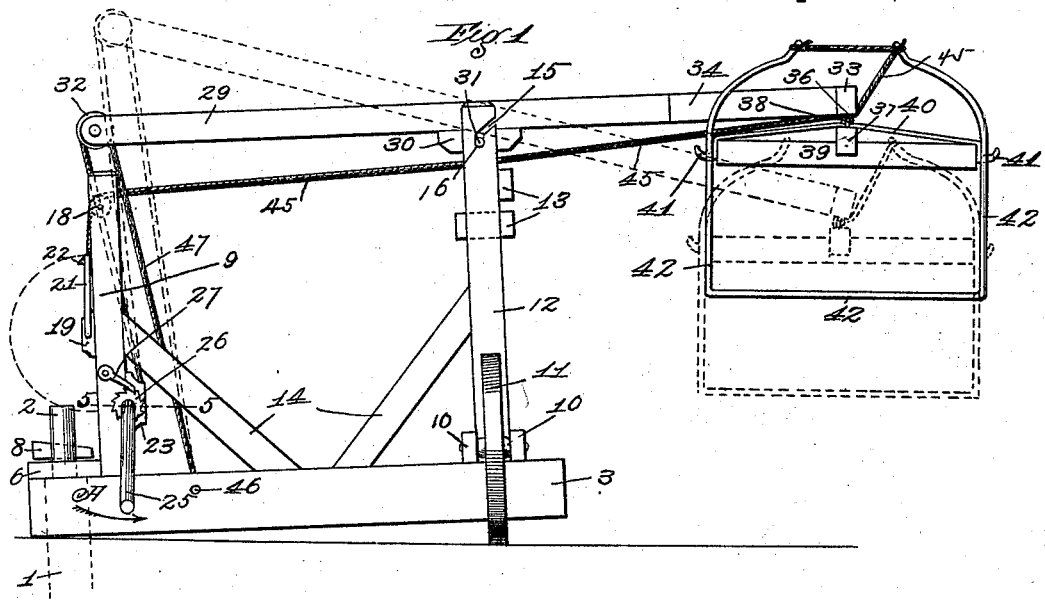
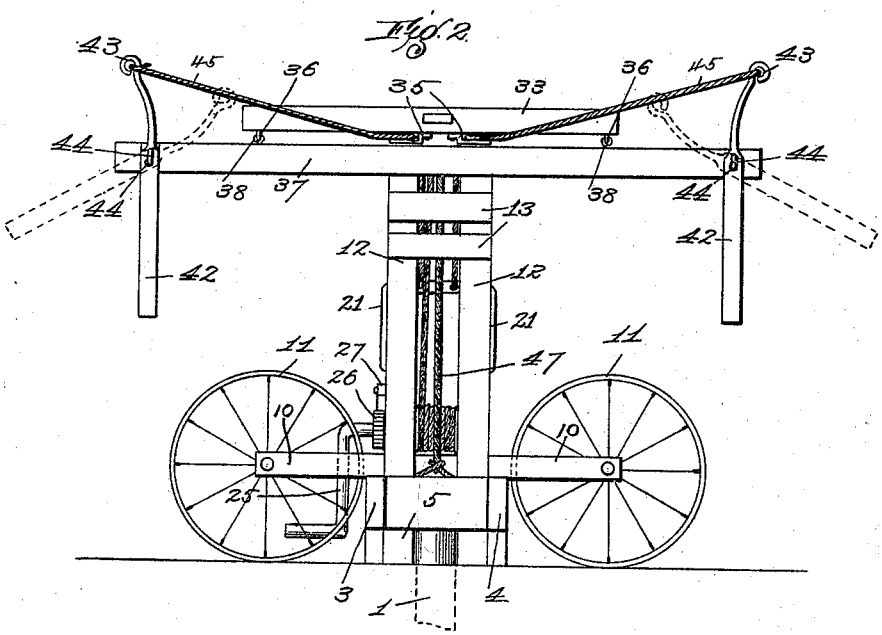
Attest:  
John L. Tunison  
W. P. Smith
Inventor  
John W. Hayes, Jr.  
By Higdon & Higdon & Longan  
Attys.
THE NORRIS PETERS CO., PHOTO-LITHO., WASHINGTON, D. C.

(No Model.) 2 Sheets—Sheet 2.
J. W. HAYES, Jr.
WAGON BOX LIFTER.
No. 537,638. Patented Apr. 16, 1895.
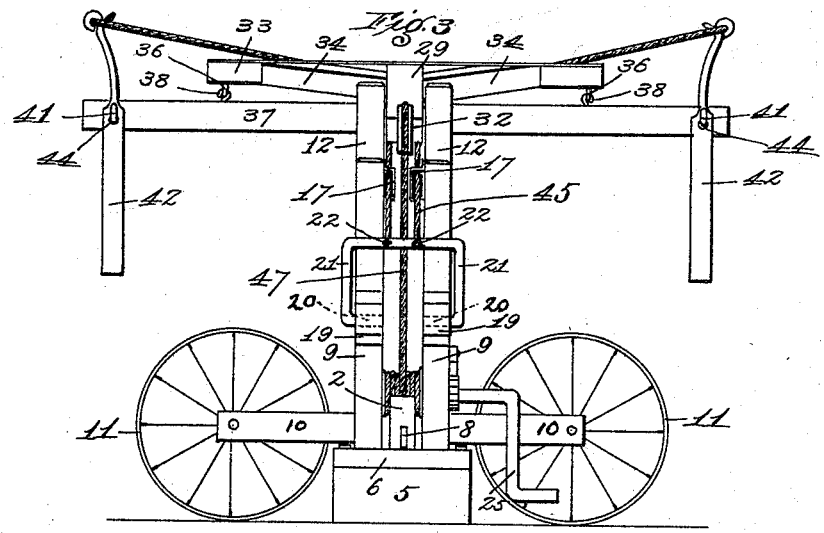
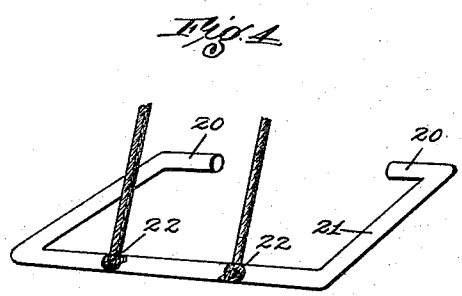
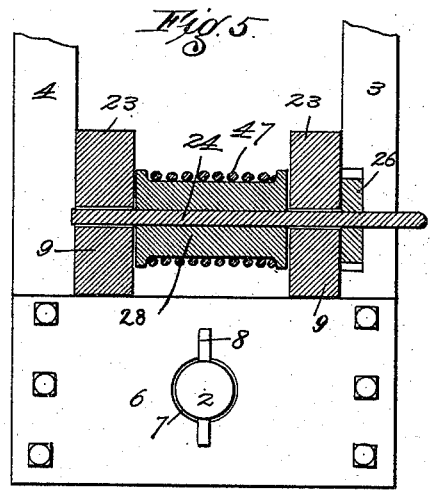
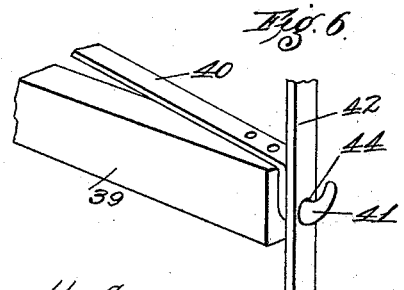
Attest:
John L. Gunison
M. P. Smith
Inventor
John W. Hayes, Jr.
By Higdon & Higdon & Longan
THE NORRIS PETERS CO., PHOTO-LITHO., WASHINGTON, D. C.

UNITED STATES PATENT OFFICE.

JOHN W. HAYES, JR., OF CHESTER, ILLINOIS.

WAGON-BOX LIFTER.

SPECIFICATION forming part of Letters Patent No. 537,638, dated April 16, 1895.

Application filed February 11, 1895. Serial No. 537,958. (No model.)

*To all whom it may concern:*

Be it known that I, JOHN W. HAYES, Jr., of the city of Chester, Randolph county, State of Illinois, have invented certain new and useful Improvements in Wagon-Box Lifters, of which the following is a full, clear, and exact description, reference being had to the accompanying drawings, forming a part hereof.

My invention relates to a wagon-box lifter and is an improvement on the wagon-box lifter, a patent for which was granted to me on December 11, 1894, No. 530,770, and consists in the novel construction, combination and arrangement of parts as will be more fully hereinafter described, pointed out in my claims and illustrated by the accompanying drawings, in which—

Figure 1 is a side elevation of my improved wagon-box lifter. Fig. 2 is a front elevation thereof. Fig. 3 is a rear elevation of the lifter. Fig. 4 is a view in perspective of a pivoted lever to which is secured the ends of manipulating ropes or cables. Fig. 5 is a horizontal sectional view taken approximately on the indicated line 5—5 of Fig. 1. Fig. 6 is a view in perspective of one of the pivot-hooks used in carrying out my invention.

Referring by numerals to the accompanying drawings, 1 indicates a post that is firmly driven into the ground, said post being constructed with a bearing 2 that projects a slight distance above the ground.

3 and 4 indicate longitudinally extending base-timbers, the same being framed together at their rear ends by a cross-timber 5. A cross-timber 6 is bolted on top of the rear ends of the longitudinally extending timbers 3 and 4 and is provided with a journal-bearing 7 at its longitudinal center through which passes the journal or upper end 2 of the timber 1 that is located in the ground. A key, such as 8, passes through the bearing 2 above the timber 6 and serves to hold the rear end of the longitudinally extending timbers and cross-timbers in proper position relative to the post 1.

Fixed to the inner sides of the timbers 3 and 4 adjacent the cross-timber 6 and extending vertically upward are parallel standards 9. Rigidly fixed upon the top edges of and near the forward ends of the timbers 3 and 4 are transverse parallel cross-timbers 10 between the opposite ends of which are journaled in any suitable manner rollers or wheels 11, the same being of sufficient size to lift the front ends of the timbers 3 and 4 from the ground, thereby allowing only the rear ends of said timbers to engage with the ground.

Rigidly fixed to the inner faces of the forward ends of the timbers 3 and 4 and between the transverse timbers 10 are vertically arranged standards 12 that are braced and joined together at a point near the upper ends thereof by brackets or cross-bars 13. Suitable braces 14 extend from a point on the inner faces of the timbers 3 and 4 adjacent the centers thereof in each direction to points on the vertically arranged standards 9 and 12 intermediate their ends.

Oppositely arranged in the upper ends of the vertical standards 12 and extending downwardly and inwardly therein are slots 15 that terminate in journal-bearings 16. Fixed to the inside faces of the vertical standards 12 immediately below these journal-bearings 16 are groove-wheels or pulleys 17, and fixed to the inner faces of the vertical standards 9 adjacent the top ends thereof are grooved wheels or pulleys 18.

Rigidly fixed to the rear sides of the vertical standards 9 and oppositely arranged from one another are journal-bearings 19 in which are located the inwardly-turned ends 20 of a rectangularly bent lever 21, the same being provided with a pair of apertures 22. Rigidly fixed to the front faces of these vertical standards 9 and just below where the braces 14 join with said vertical standards are journal-bearings 23 in which is mounted for rotation a shaft 24, one end of which extends beyond one of the vertical standards 9 and is formed into a crank-handle 25. Upon this shaft 24 adjacent one of the vertical standards 9 and journal-bearing 23 thereon is rigidly fixed a ratchet-wheel 26, and pivoted to the side of said vertical standard 9 immediately above this ratchet-wheel 26 is a gravity-pawl 27, the point of which engages between the teeth of said ratchet-wheel. Rigidly mounted upon this shaft 24 between the vertical standards 9 is a sheave or drum 28.

29 indicates a lifting lever, the same being provided on its under side and at the longitudinal center thereof with a block 30 from which project lateral trunnions or journals 31 that are mounted for rotation in the journal-bearings 16 previously mentioned. The rear end of this lever 29 is constructed with a vertical slot or bifurcation in which is journaled a grooved wheel or pulley 32. To the outer end of the lever 29 is framed a cross-arm 33 and braces 34 extend from points near the ends of this cross-arm 33 to the lever 29, thereby very rigidly fixing said cross-arm to the end of the lever. Fixed to the under side of the cross-arm 33 and adjacent the lever 29 are a pair of grooved wheels or pulleys 35. Eye-bolts 36 pass through the ends and depend from the under side of the cross-arm 33.

A transverse arm 37 is swung and pivoted directly beneath the cross-arm 33 by means of eye-bolts 38 passing vertically through said transverse arm, and have their upper ends looped or hooked in the eye-bolts 36. Fixed to the under side and near the outer ends of the bar 37 (the same being somewhat longer than is the arm 33) are cross-bars 39. Truss-rods 40 are bolted at their longitudinal centers to the ends and on top of the transverse bar 37 and extend from said bar in both directions to the ends of the cross-bars 39 where they are bolted or rigidly fixed in any suitable manner, and are there formed into laterally projecting hooks 41.

Suitable bars or straps are bent into rectangular loops 42, said loops being of such a width as to easily engage an ordinary wagon-box. The upper ends of these loops are bent inwardly and terminate in the oppositely arranged eyes 43. Apertures 44 are formed in the side portions of these loops 42, said apertures receiving the hooks 41 projecting laterally from the ends of the cross-bars 39. Thus said loops 42 are free to swing and oscillate on said hooks 41.

Secured to one pair of the eyes 43 formed at the upper ends of the loops 42 are the forward ends of ropes or cables 45, said ropes or cables passing from the first pair of eyes through the second pair, from thence toward the lever 29 around the grooved wheels or pulleys 35 on the under side of the cross-arm 33, from thence rearwardly over the grooved wheels or pulleys 17 fixed to the inner faces of the vertical standards 12, from thence over the grooved wheels or pulleys 18 fixed to the inner faces of the vertical standards 9 and passing vertically downward therefrom are engaged in the apertures or eyes 22 formed in the rectangular lever 21.

Fixed to a pin 46 that passes transversely through the longitudinally extending timbers 3 and 4 is one end of a rope or cable 47 that passes upwardly over the grooved wheel or pulley 32 in the end of the lever 29, and passing from thence downwardly is wound upon the sheave or drum 28, and is secured thereto.

The operation is as follows: When it is desired to lift a wagon-box, the operator turns the crank-handle 25 of the shaft 24 in the direction the reverse of that indicated by the arrow A in Fig. 1. This winds a portion of the rope or cable 47 upon the drum or sheave 28 necessarily lowering the rear end of the lever 29 and raising the forward end and parts mounted thereon and fixed thereto. When the forward end of said lever and parts are raised a sufficient distance from the ground, a wagon is positioned immediately in front of the vertically arranged standard 12 and beneath the transverse bar 37 and cross-arm 39. The operator now grasps the lever 21 and throws the same downwardly as indicated by dotted lines in Fig. 1. This draws the ropes or cables 45 rearwardly over the pulleys 18 and 17, through the pulleys 35 and causes the rectangular loops 42 to oscillate and be drawn into positions as indicated by dotted lines in Fig. 2. The rectangular loops 42, ropes or cables 45 and lever 21 will be held in these positions as the portion of said lever 21 to which the cables 45 are fixed when thrown downwardly against the vertically arranged post 9 passes a vertical line drawn through the pivotal center of said lever. By releasing the gravity-pawl 27 from the ratchet-wheel 26 and allowing the cable 45 to unwind from the drum or sheave 28, the rear end of the lever 29 will move upwardly and the forward end thereof and parts attached will be lowered. When the transverse bar 37 is immediately over the wagon-box, the lever 21 is returned to its normal position which allows the rectangular loops 42 to return to their normal position and engage beneath the ends of the wagon-box. This being done the operator re-engages the gravity-pawl 27 with the ratchet-wheel 26 and so manipulates the crank-handle 25 of the shaft 24 as to wind the rope or cable 47 upon the sheave or drum 28. This movement, it will be plainly seen, raises the wagon-box from its position upon the bed of the wagon and thereby accomplishes the desired result. It will be plainly seen how by a reversal of the movements and operations just described the wagon-box may be repositioned upon the wagon-bed.

It will be noted that the forward end of the lifter is mounted upon wheels or rollers and the rear end is practically pivoted upon the upper end of the post 1. This allows the forward portion and rectangular loops of the lifter to be swung around into various positions, and this construction is especially advantageous when swinging or moving wagon-boxes from one bed to another, and said lifter thereby performing the function of a crane.

Much time and labor are saved by a lifter constructed in accordance with the foregoing description and it can be operated by a single person very easily and expeditiously. Thus it will be seen how I have constructed a wagon-box lifter that possesses superior advantages in point of simplicity, durability and general efficiency, is of minimum cost, and very easily operated.

What I claim is—

1. A wagon-box lifter, comprising a suitable frame work, a vertical standard to which the rear end of said frame work is pivoted, wheels or rollers journaled in and carrying the forward end of the frame, vertical standards fixed to the front and rear ends of said frame, a lifting lever fulcrumed between the upper ends of the forward pair of vertical standards, a transverse bar swung beneath the forward end of the lifting lever, cross-arms fixed to the outer ends of the transverse bar, truss-rods extending from the ends of the transverse bar to the ends of the cross-arms, hooks formed integral with the ends of said truss-rods, rectangularly bent loops pivoted to said hooks, ropes or cables fixed to the upper ends of said loops, grooved wheels or pulleys fixed to the vertical standards and over which the ropes or cables pass, and a rectangularly bent lever fulcrumed to the rear pair of vertical standards and to which the ropes or cables are attached.

2. In a wagon-box lifter, a suitable frame work, a vertically arranged post to which the rear end of the frame work is pivoted, wheels or rollers journaled in and carrying the front end of the frame work, vertical standards fixed to the front and rear ends of the frame work, a lifting lever fulcrumed at its longitudinal center between the upper ends of the forward pair of vertical standards, a shaft journaled transversely to the rear pair of vertical standards, a drum mounted upon said shaft, a rope or cable engaging the rear end of the lifting lever and wound upon said drum, a transverse bar swung from beneath the forward end of the lifting lever, cross-bars fixed to the outer ends of the transverse bar, truss-rods fixed to the ends of the transverse bar and extending to the ends of the cross-arms, hooks formed integral with the ends of said truss-rods, rectangularly bent loops for engaging the wagon-box pivoted to said hooks, ropes or cables passing from the upper portions of said loops to the rear pair of vertical standards, and a lever fulcrumed to said standards and to which the rear ends of said ropes or cables are fixed.

In testimony whereof I affix my signature in presence of two witnesses.

JOHN W. HAYES, JR.

Witnesses:
J. M. HICKS,
JOHN J. SCHNEIDER.